(12) United States Patent
Hatch

(10) Patent No.: US 6,664,975 B1
(45) Date of Patent: Dec. 16, 2003

(54) CHEAP WELL-BEHAVED AFFINE TRANSFORMATION OF BOUNDING SPHERES

(75) Inventor: Don Hatch, Santa Cruz, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/576,740

(22) Filed: May 23, 2000

(51) Int. Cl.⁷ ............................................... G06T 15/10
(52) U.S. Cl. ....................................... 345/622; 345/623
(58) Field of Search ................................. 345/622, 623, 345/648

(56) References Cited

U.S. PATENT DOCUMENTS 5,757,321 A * 5/1998 Billyard ....................... 345/426

* cited by examiner

Primary Examiner—Jeffery Brier
(74) Attorney, Agent, or Firm—Woodcock Washburn LLP

(57) ABSTRACT

The present invention relates to a method and apparatus for obtaining a bounding sphere for the ellipsoid that results when an affine transformation matrix transforms a bounding volume. The present invention accomplishes this by using Gershgorin intervals to obtain a new radius for the bounding volume. The invention operates on a scene graph, which is comprised of a number of nodes arranged in a hierarchical organization. At least one of these nodes is an affine transformation matrix, which is used for operations such as rotations, scaling, and translations. Associated with the transformation matrix is a bounding sphere. The present invention calculates the radius of a new bounding sphere that encircles the ellipsoid formed when the affine matrix transforms the old bounding volume. The use of Gershgorin intervals is fast and yields accurate results. Thus, the present invention provides for a method and apparatus that is computationally fast and produces a well-behaved affine transformation of bounding spheres.

18 Claims, 4 Drawing Sheets

```
┌─────────────────────────────────────────────────────────┐
│ Calculate the Six Unique Entries of the Affine Matrix   │ 701
│                times its Transpose                      │
└─────────────────────────────────────────────────────────┘
                            │
┌─────────────────────────────────────────────────────────┐
│     Calculate the Upper Bounds of the Gershgorin Intervals │ 703
└─────────────────────────────────────────────────────────┘
                            │
┌─────────────────────────────────────────────────────────┐
│          Select the Largest Gershgorin Upper Bound      │ 705
└─────────────────────────────────────────────────────────┘
                            │
┌─────────────────────────────────────────────────────────┐
│    Find the square root of the largest Gershgorin Upper │ 707
│                          Bound                          │
└─────────────────────────────────────────────────────────┘
                            │
┌─────────────────────────────────────────────────────────┐
│   Multiply last result by the old radius to get the new │ 709
│                          radius                         │
└─────────────────────────────────────────────────────────┘
```

*FIG. 7*

$$\underbrace{\begin{bmatrix} a & d & g \\ b & e & h \\ c & f & i \end{bmatrix}}_{801} \underbrace{\begin{bmatrix} a & b & c \\ d & e & f \\ g & h & i \end{bmatrix}}_{803} = \underbrace{\begin{bmatrix} m_{00} & m_{01} & m_{02} \\ m_{10} & m_{11} & m_{12} \\ m_{20} & m_{21} & m_{22} \end{bmatrix}}_{805}$$

$$807 \begin{cases} [\, m_{00} - |m_{01}| - |m_{02}|\,,\ m_{00} + |m_{01}| + |m_{02}|\,] \\ [\, m_{11} - |m_{10}| - |m_{12}|\,,\ m_{11} + |m_{10}| + |m_{12}|\,] \\ [\, m_{22} - |m_{20}| - |m_{21}|\,,\ m_{22} + |m_{20}| + |m_{21}|\,] \end{cases}$$

*FIG. 8*

CHEAP WELL-BEHAVED AFFINE TRANSFORMATION OF BOUNDING SPHERES

FIELD OF INVENTION

The present invention relates to the field of processing scene graphs used in the display of computer-generated images. More specifically, the present invention relates to a method and apparatus for quickly and accurately creating well-behaved affine transformations of bounding spheres.

BACKGROUND OF THE INVENTION

Computer graphics is used in a wide variety of applications, such as in business, science, animation, simulation, computer-aided design, process control, electronic publication, gaming, medical diagnosis, etc. In an effort to portray a more realistic real-world representation, three-dimensional objects are transformed into models having the illusion of depth and displayed onto a two dimensional computer screen. Conventionally, polygons are used to construct these three-dimensional objects. Next, a scan conversion process is used to determine which pixels of a computer display fall within each of the specified polygons. Thereupon, texture is selectively applied to those pixels residing within specified polygons. In addition, hidden or obscured surfaces are eliminated from view. Finally, lighting shading, shadowing, translucency, and blending effects are applied.

For a high-resolution display, having over a million pixels, displaying a three-dimensional scene on a computer system is mathematically intensive and requires tremendous processor power. Furthermore, the computer system must be extremely fast to handle dynamic computer graphics, for example, displaying a three-dimensional object in motion. Even more processor power is required for interactive computer graphics, whereby three-dimensional images change in response to user input. Still more processor power is required to achieve a scene with more intricate details.

Given the tremendous demands that rendering scene graphs places on the processor. the number of complex mathematical computations performed should be kept to a minimum. One conventional alternative to performing complex mathematical operations is using mathematical shortcuts to estimate parameters. However, these shortcuts often fail to yield accurate results.

An example of this problem is calculating which portion of the object or scene graph needs to be displayed on the computer monitor. Conventionally, a bounding volume, which is stored in the scene graph, is compared with a viewer frustum or viewpoint. If they intersect. the computer displays the portion of the scene graph which corresponds to the bounding volume. If they do not intersect, there is no need to process the details of the un-displayed portion of the scene graph. During conventional image processing, the size and shape of the bounding volume is altered by a transform matrix. This matrix rotates, translates, squashes, or scales the object, as well as the bounding volume. It is computationally very difficult to arrive at the size and shape of the altered bounding volume. Conventionally, the exact size of a bounding sphere around the altered bounding volume may be calculated. However, this can require complex mathematical operations, such as solving a cubic polynomial. Another conventional method is to estimate the size of the bounding sphere. However, estimation is sometimes mathematically intensive, and mathematical shortcuts are often inaccurate. For example, some conventional methods produce accurate results for only a limited class of transform matrices.

Therefore, a need exists for a method and apparatus for obtaining a bounding sphere for the ellipsoid that results when an affine transformation matrix operates on a bounding volume. The method and apparatus needs to be computationally fast, as well as accurate for any type of affine transform matrix.

SUMMARY OF THE INVENTION

The present invention relates to a method and apparatus for obtaining a bounding sphere for the ellipsoid that results when an affine transformation matrix transforms a bounding volume. The present invention accomplishes this by using Gershgorin intervals to obtain a new radius for the bounding volume. The invention operates on a scene graph, which is comprised of a number of nodes arranged in a hierarchical organization. At least one of these nodes is an affine transformation matrix, which is used for operations such as rotations, scaling, and translations. Associated with the transformation matrix is a bounding sphere. The present invention calculates the radius of a new bounding sphere that encircles the ellipsoid formed when the affine matrix transforms the old bounding volume. The use of Gershgorin intervals is fast and yields accurate results. Thus, the present invention provides for a method and apparatus that is computationally fast and produces a well-behaved affine transformation of bounding spheres.

In another embodiment, the present invention compares the transformed bounding sphere with a viewer frustum to decide whether to display the corresponding portion of the scene graph and whether to continue traversing down the scene graph. Thus, the present invention provides a method and apparatus for fast and accurate rendering of scene graphs.

These and other objects and advantages of the present invention will no doubt become obvious to those of ordinary skill in the art after having read the following detailed description of the preferred embodiments, which are illustrated in the various drawing figures.

BRIEF DESCRIPTION OF THE DRAWINGS

The operation of this invention can best be visualized by reference to the drawings.

FIG. 7 is a flowchart describing the steps in calculating the new radius for the bounding sphere.

FIG. 8 provides details for calculating the Gershgorin intervals.

DETAILED DESCRIPTION

A method and apparatus for a computationally fast and well-behaved affine transformation of bounding spheres is described. In the following description, for purposes of explanation, numerous specific details are set forth in order to provide a thorough understanding of the present invention. It will be obvious, however, to those skilled in the art that the present invention may be practiced without these specific details, in other instances, well-known structures and devices are shown in block diagram form in order to avoid obscuring the present invention.

Figure 1:
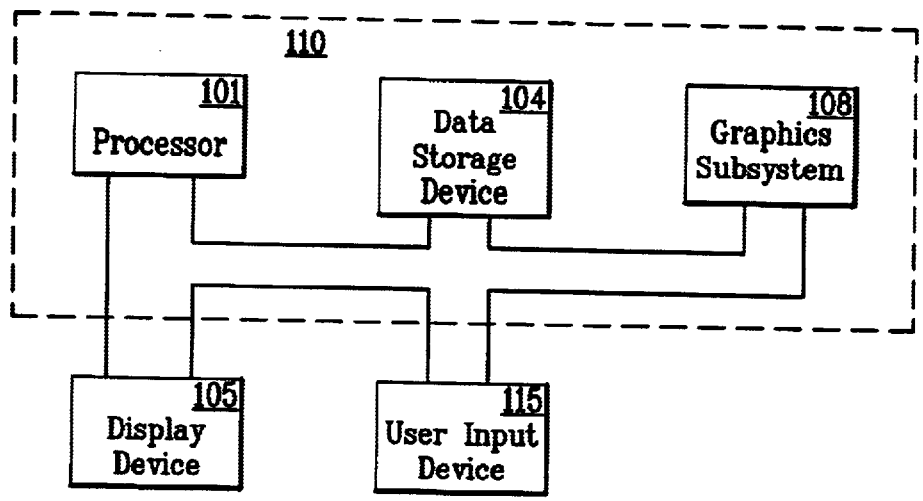
FIG. 1 shows a computer system upon which the present invention may be practiced.

FIG. 1 shows a computer system upon which the present invention may be practiced. Initially, an original three-dimensional scene is created and described in file format (e.g., VRML) by a programmer. The programmer describes both components of the scene (e.g., geometry, materials, lights, images, movies, and sounds) as well as the relationships among those components. These relationships may be static (e.g., a transformation hierarchy) or dynamic (e.g., the values of transformations in the hierarchy). Changes in one element of the scene graph may be made to effect changes in others. For instance, a change in position of a light-bulb shaped geometry can be made to cause a change in position of light source. In addition, information about the locations and characteristics of viewpoints may be included in the scene. Once created, the files are stored in the storage device 104 (e.g., a hard disk drive) of the computer system 110.

In practice, applications running on a processor 101 will be used to build a scene graph in order to have a graphics subsystem 108 draw it onto a display device 105. Optionally, the user may choose to edit the three-dimensional scene by inputting specific commands via the input device 115 (e.g., a keyboard, mouse, joystick, lightpen, etc.). The user may also interact with the three-dimensional scene (e.g., flight simulation, game playing, etc.) through user input device 115.

Figure 2:
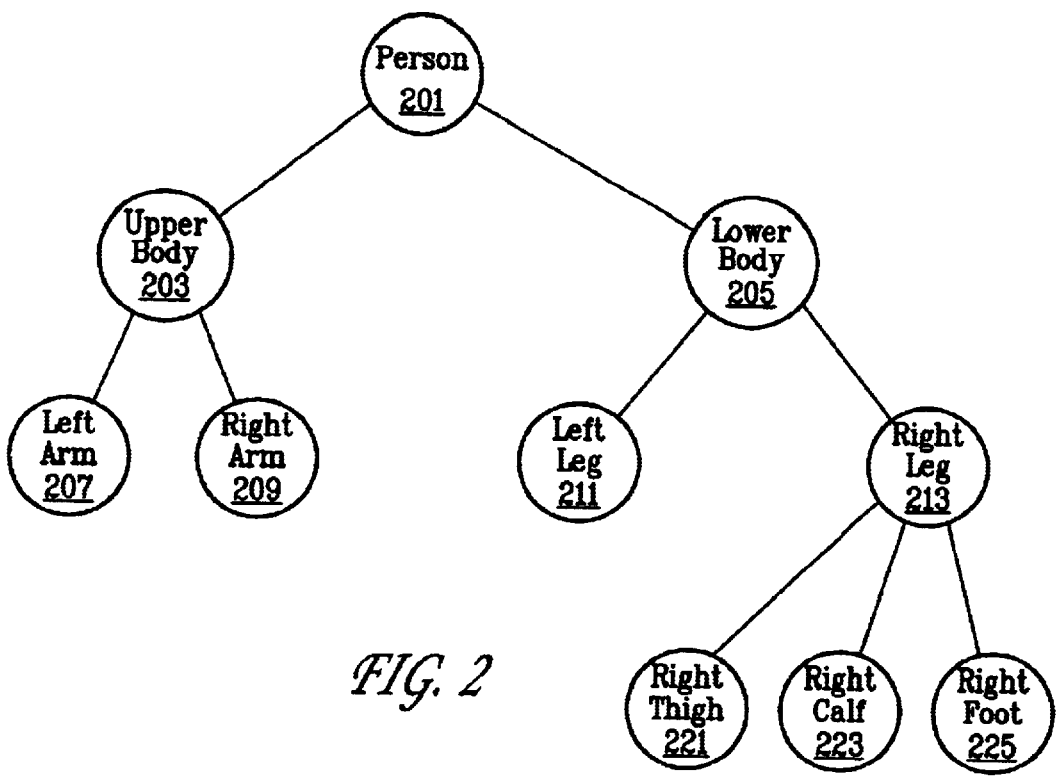
FIG. 2 shows an exemplary scene graph.

FIG. 2 shows a pictorial representation of a scene graph. The graph is comprised of nodes, which are abstract representations of objects. In FIG. 2, the overall person is represented by node 201. The person node 201 is comprised of an upper body node 203 and a lower body node 205. Each of these nodes has its own set of nodes as well (i.e., child nodes). For example, the upper body is comprised of a left arm node 207 and a right arm node 209. Likewise, the lower body is comprised of a left leg node 211 and a right leg node 213. In turn, the right leg node 213 is comprised of a right thigh node 221, a right calf node 223, and a right foot node 225. The scene in FIG. 2 contains little detail because only a few nodes are shown. However, almost limitless detail can be achieved by adding more levels of nodes.

Figure 3:
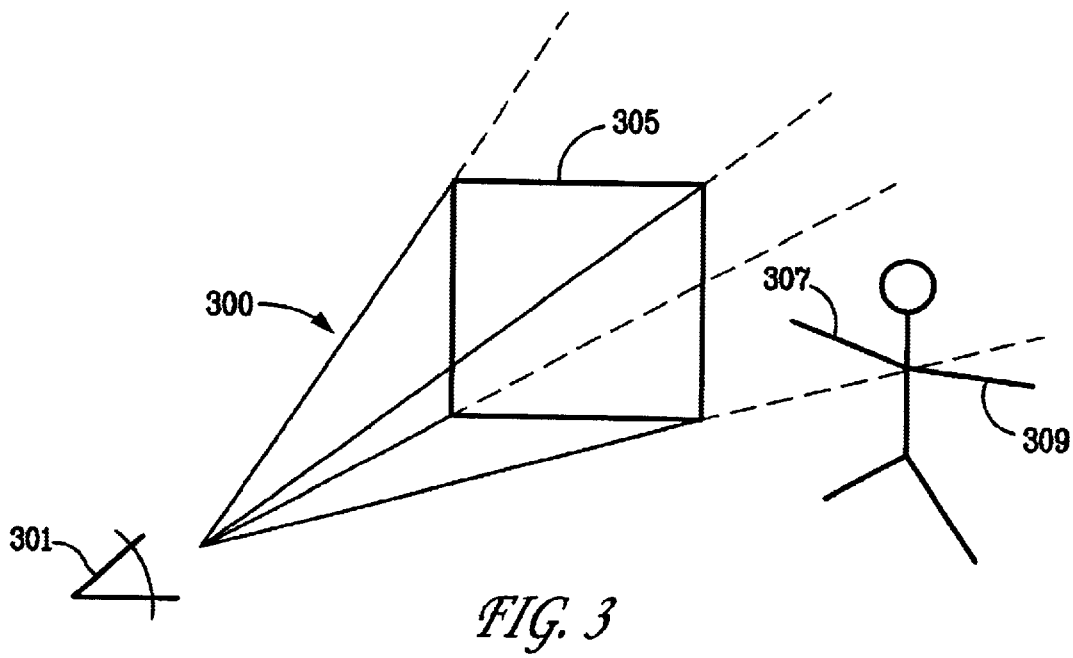
FIG. 3 shows a viewer frustum for determining which portion of a scene graph should be displayed.

Rendering a hierarchical scene graph for display requires traversing it to decide which portions should be displayed. FIG. 3 shows a view frustum 300 from point of view 301 for determining what should be displayed on computer screen 305. Anything falling within the view frustum 300 should be displayed. In this example, since left arm 307 falls within the view frustum 300, it should be displayed. However, the right arm 309 falls outside the view frustum 300 and should not be displayed.

Figure 4:
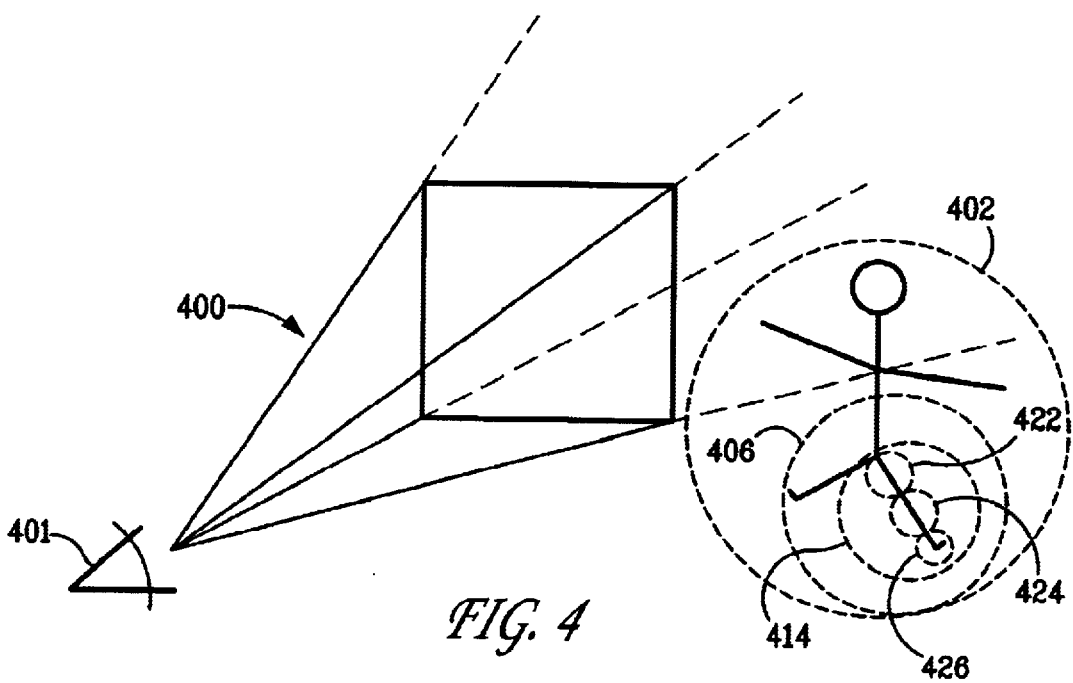
FIG. 4 shows a viewer frustum and bounding volumes for determining which portion of a scene graph should be displayed.

To assist in the rendering process, the preferred embodiment of the present invention stores bounding volumes at each node of the scene graph. FIG. 4 shows bounding volumes for the whole person 402, lower body 406, right leg 414, right thigh 422, right calf 424, and right foot 426. In one embodiment, when rendering a scene with respect to a certain viewpoint 401, a bounding volume is compared with the frustum 400. If they do not intersect, there is no need to traverse further down the scene graph. For example, because the lower body bounding sphere 406 does not intersect with the view frustum 400, not only is the lower body not displayed, but also there is no need to traverse further down the scene graph. In other words, it is not necessary to compare the bounding volumes of the lower body's children nodes (i.e., the leg nodes) with the view frustum. This is because the bounding volume of the lower body node 406 contains the union of the bounding volumes of all of the nodes in its subgraph (i.e., its children nodes, grandchildren nodes, and so on down the hierarchy).

Figures 5, 6:
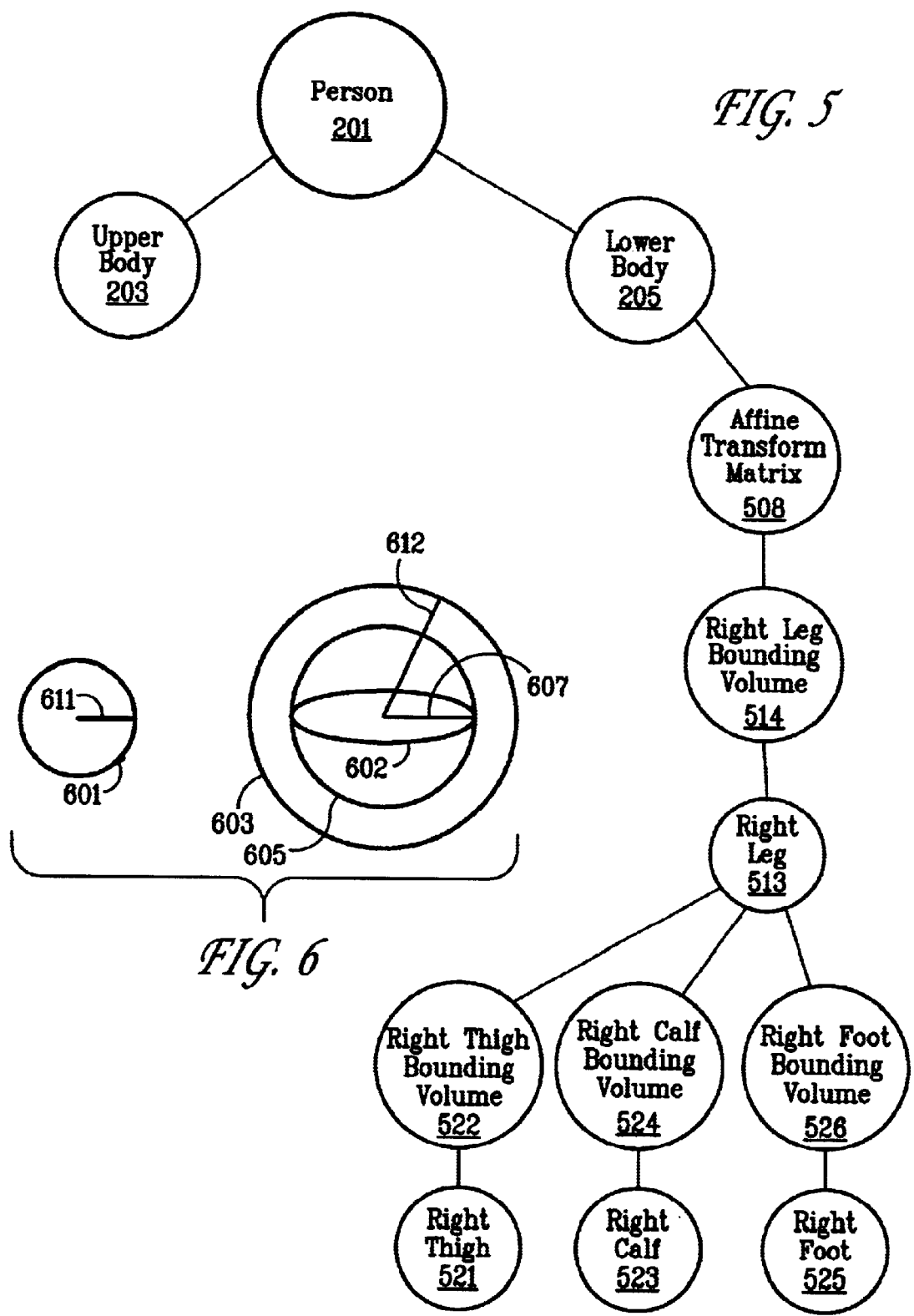
FIG. 5 shows a scene graph with an affine transformation matrix node and bounding sphere nodes.
FIG. 6 shows a bounding sphere and the ellipsoid that is formed when the sphere is transformed by an affine matrix.

The preferred embodiment also stores affine transform matrix nodes in the scene graph. FIG. 5 shows such a matrix node 508. These affine matrices transform a portion of the scene graph in some manner, such as scaling rotating, translating, or squashing. FIG. 5 also shows bounding volumes for the right leg 514, right thigh 522, right calf 524, and right foot 526. Each node is the scene graph has such a volume, although for simplicity others are not shown. As an example, the affine matrix 508 might perform right hip rotation, although it will be understood by those in the art that many other operations are possible. Furthermore, the matrix transforms all the nodes below it. For example, the affine matrix transforms nodes 513, 514, and nodes 521–526. Thus it transforms not just the object nodes (e.g., legs) but also transforms the bounding spheres.

FIG. 6 shows how the affine transform matrix will generally transform the original bounding sphere 601, having a first radius 611, into an ellipsoid 602. The preferred embodiment of the present invention teaches a way to calculate a radius 612 for a bounding sphere 603, such that the bounding sphere 603 completely surrounds the ellipsoid 602. Sphere 605 is of the ideal size, as it completely encloses the ellipsoid 602 and has the smallest possible radius 607. According to the present invention, the second sphere 603 will always be large enough to fully contain the ellipsoid 602, although it could be somewhat larger than absolutely necessary. It can be shown that the new radius 612 can never be more than the sqrt(3) times as large as the ideal size radius 607, given that a 3×3 affine transform matrix is used. Thus, the present invention provides a method and apparatus for an accurate calculation of the radius 612 of transformed bounding spheres.

More specifically, the present invention calculates how much the radius 611 for the sphere 601 should be expanded or contracted to form a new sphere 603, as described. The most accurate answer could be found by multiplying radius 611 by the singular value of the affine transform matrix. (Which, in this case, is equal to the square root of the largest eigenvalue of the matrix times its transform.) Unfortunately, this is a complex calculation. However, the eigenvalues of any real valued 3×3 symmetric matrix always lie within the respective Gershgorin intervals. The present invention calculates the upper bounds of the three Gershgorin intervals for the affine matrix times its transpose. Thus, an upper bound on the singular value is found. Finally, the old sphere radius 611 is multiplied by the upper bound on the singular value. This method is much simpler mathematically than conventional methods. Thus, the present invention provides for a method and apparatus for fast calculation of the radius of transformed bounding spheres.

FIG. 7 shows a flowchart for calculating the new radius of the transformed sphere, according to the present invention. In step 701, the six unique entries of the affine matrix times its transpose are calculated. (Because there will always be only six and not nine unique entries for the 3×3 matrix, the present invention saves even more processing time.) In step 703, the upper bounds of the three Gershgorin intervals are found. In step 705, the largest of the upper bounds is selected. In step 707, the square root is taken. Finally, in step 709, the radius of the old bounding sphere is multiplied by the square root just calculated. This provides a radius for the transformed bounding sphere that is at least as large as necessary, but may never be more than sqrt(3) times as large as necessary, given that a 3×3 affine matrix is used.

FIG. 8 shows more details for the calculation of the upper bounds of the Gershgorin intervals. In FIG. 8, a 3×3 matrix 801 and its transpose 803 are shown. Matrix 805 is the symmetric matrix that results from multiplying the matrix by its transform. The three Gershgorin intervals 807 are shown as well.

The following is a mathematical proof that the Gershgorin upper bound on the maximum singular value of a 3×3 matrix M is at most sqrt(3) times the actual singular value of M. (And thus the radius calculation can never be more than sqrt(3) times as large as necessary.)

Let M' denote transpose (M).

We know that (the maximum singular value of M)>= (maximum column length in M), since M scales the length of the corresponding unit basis vector by that amount.

Squaring both sides, we get: (maximum eigenvalue of M'M)>=(maximum diagonal entry of M'M).

But note that (maximum diagonal entry of M'M) is actually the maximum of the absolute values of all the entries of M'M (since the entries of M'M are the pairwise dot products of the columns of M, and the maximum such dot product is achieved as the dot product of the longest column vector with itself).

So (maximum eigenvalue of M'M)>=the absolute value of each entry of M'M.

So the Gershgorin upper bound on the maximum eigenvalue of M'M, which is of the form: |a|+|b|+|c| for some entries a,b,c of M'M,<=3*(maximum eigenvalue of M'M).

Taking the square roots of both sides, this says that the Gershgorin upper bound on the maximum singular value of M is<=sqrt(3) times the actual maximum singular value of M.

Another embodiment of the present invention multiples the transpose of the affine matrix times the affine matrix instead of the reverse. As the actual eigenvalues are the same regardless of the order of multiplication, the result is acceptable. However, reversing the multiplication may result in a faster calculation. This is because in certain cases the matrix columns are more likely to be pairwise orthogonal than the rows. Thus, this embodiment of the present invention provides for a method and apparatus that is computationally fast, as well as accurate.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for rendering a scene graph with hierarchical structure, comprising the steps of:

a) creating an affine transform matrix;

b) storing said affine transform matrix in memory;

c) creating a first bounding sphere having a first radius;

d) storing said first bounding sphere in memory and forming an ellipsoid by multiplying said first bounding sphere by said affine transform matrix;

e) calculating a second radius for a second bounding sphere, said second radius being at least large enough so that said second sphere would surround the ellipsoid; and f) storing said second radius in memory and rendering the scene graph based on the second bounding sphere.

2. The method of claim 1, where said affine transform matrix is a 3×3 matrix.

3. The method of claim 1, further including the steps of:

g) creating a viewer frustum;

h) storing said viewer frustum in memory; and, i) comparing said second bounding sphere with said viewer frustum for intersection.

4. The method of claim 3, further including the step of:

j) continuing to traverse down said scene graph with hierarchical structure until said second bounding sphere does not intersect with said viewer frustum.

5. The method of claim 1 where the second radius is calculated by:

e1) calculating an upper bound for the largest eigenvalue of the product of the transpose of said affine transform matrix multiplied by said affine transform matrix; and, e2) calculating said second radius by multiplying said first radius by the square root of said upper bound of the largest eigenvalue of the product of the transpose of said affine transform matrix multiplied by said affine transform matrix.

6. The method of claim 1, where the second radius is calculated by:

e1) calculating the upper bounds of the Gershgorin intervals of the product of the transpose of said affine transform matrix multiplied by said affine transform matrix; and, e2) calculating said second radius by multiplying said first radius by the square root of said upper bound of the largest of the upper bounds of the Gershgorin intervals of the product of the transpose of said affine transform matrix multiplied by said affine transform matrix.

7. The method of claim 6, wherein the upper bounds of the Gershgorin intervals of the product of the transpose of said affine transform matrix multiplied by said affine transform matrix are calculated by:

e1) calculating the unique entries of the product of the transpose of said affine transform matrix multiplied by said affine transform matrix; and, e2) calculating the upper bounds of the Gershgorin intervals according to the equations:

first upper bound=$m_{00}+|m_{01}|+|m_{02}|$;

second upper bound=$m_{11}+|m_{10}|+|m_{12}|$;

third upper bound=$m_{22}+|m_{20}|+|m_{21}|$;

where $m_{00}$, $m_{01}$, $m_{02}$, $m_{10}$, $m_{11}$, $m_{12}$, $m_{20}$ $m_{21}$, and $m_{22}$ are the elements of the matrix formed by the product of the transpose of said affine transform matrix multiplied by said affine transform matrix.

8. The method of claim 1, where the second radius is calculated by:

e1) calculating upper bounds of the Gershgorin intervals of the product of said affine transform matrix multiplied by the transpose of said affine transform matrix; and, e2) calculating said second radius by multiplying said first radius by the square root of said upper bound of the largest of the upper bounds of the Gershgorin intervals of the product of said affine transform matrix multiplied by the transpose of said affine transform matrix.

9. A computer system for rendering a scene graph with hierarchical structure, comprising:

a) a processor for creating a first data structure of an affine transform matrix, and a second data structure of a first bounding sphere having a first radius;

b) a memory coupled to the processor for storing the first data structure and the second data structure; and, c) a calculation circuit coupled to said processor for forming an ellipsoid by multiplying said first bounding sphere by said affine transform matrix, calculating the radius of a second bounding sphere, said second radius being at least large enough so that said second bounding sphere would surround the ellipsoid, and rendering the scene graph based on the second bounding sphere.

10. The computer system of claim 9, wherein said calculation circuit calculates said second radius by:

c1) calculating an upper bound for the largest eigenvalue of the product of the transpose of said affine transform matrix multiplied by said affine transform matrix; and, c2) calculating said second radius by multiplying said first radius by the square root of the upper bound of the largest eigenvalue of the product of the transpose of said affine transform matrix multiplied by said affine transform matrix.

11. The computer system of claim 9, wherein said calculation circuit calculates said second radius by:

c1) calculating the upper bounds of the Gershgorin intervals of the product of the transpose of said affine transform matrix multiplied by said affine transform matrix; and, c2) calculating said second radius by multiplying said first radius by the square root of said upper bound of the largest of the upper bounds of the Gershgorin intervals of the product of the transpose of said affine transform matrix multiplied by said affine transform matrix.

12. The computer system of claim 11, wherein said calculation circuit calculates the upper bounds of the Gershgorin intervals of the product of the transpose of said affine transform matrix multiplied by said affine transform matrix are calculated by:

calculating the unique entries of the product of the transpose of said affine transform matrix multiplied by said affine transform matrix; and, calculating the upper bounds of the Gershgorin intervals according to the equations:

first upper bound = $m_{00} + |m_{01}| + |m_{02}|$;

second upper bound = $m_{11} + |m_{10}| + |m_{12}|$;

third upper bound = $m_{22} + |m_{20}| + |m_{21}|$;

where $m_{00}, m_{01}, m_{02}, m_{10}, m_{11}, m_{12}, m_{20}, m_{21}$, and $m_{22}$ are the elements of the matrix form by product of the transpose of said affine transform matrix multiplied by said affine transform matrix.

13. The computer system of claim 9, wherein said calculation circuit calculates said second radius by:

c1) calculating the upper bounds of the Gershgorin intervals of the product of said affine transform matrix multiplied by the transpose of said affine transform matrix; and, c2) calculating said second radius by multiplying said first radius by the square root of said upper bound of the largest of the upper bounds of the Gershgorin intervals of said affine transform matrix multiplied by the transpose of said affine transform matrix.

14. The computer system of claim wherein:

said processor further creates a viewer frustum;

said memory further stores said viewer frustum; and, said calculation circuit further compares said second bounding sphere with said viewer frustum for intersection.

15. The computer system of claim 14, further comprising traversal circuitry coupled to said processor for traversing down said scene graph with hierarchical structure until said second bounding sphere does not intersect with said viewer frustum.

16. A computer-readable medium having stored thereon instructions for causing a computer system to render a scene graph with hierarchical structure, said instructions causing the computer system to carry out the steps of:

a) creating an affine transform matrix;

b) storing said affine transform matrix in memory;

c) creating a first bounding sphere having a first radius;

d) storing said first bounding sphere in memory and forming an ellipsoid by multiplying said first bounding sphere by said affine transform matrix;

e) calculating a second radius for a second bounding sphere, said second radius being at least large enough so that said second sphere would surround the ellipsoid; and f) storing said second radius in memory and rendering the scene graph based on the second bounding sphere.

17. The computer-readable medium of claim 16, wherein step e) further comprises:

e1) calculating an upper bound for the largest eigenvalue of the product of the transpose of said affine transform matrix multiplied by said affine transform matrix; and, e2) calculating said second radius by multiplying said first radius by the square root of said upper bound of the largest eigenvalue of the product of the transpose of said affine transform matrix multiplied by said affine transform matrix.

18. The computer-readable medium of claim 16, wherein step e) further comprises:

e1) calculating the upper bounds of the Gershgorin intervals of the product of the transpose of said affine transform matrix multiplied by said affine transform matrix; and, e2) calculating said second radius by multiplying said first radius by the square root of said upper bound of the largest of the upper bounds of the Gershgorin intervals of the product of the transpose of said affine transform matrix multiplied by said affine transform matrix.

* * * * *